(12) United States Patent
Xu et al.

(10) Patent No.: US 11,543,671 B2
(45) Date of Patent: *Jan. 3, 2023

(54) STRUCTURED LIGHT PROJECTION MODULE AND DEPTH CAMERA

(71) Applicant: ORBBEC INC., Guandong (CN)

(72) Inventors: Xing Xu, Shenzhen (CN); Xu Chen, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 112 days.

This patent is subject to a terminal disclaimer.

(21) Appl. No.: 17/000,589

(22) Filed: Aug. 24, 2020

(65) Prior Publication Data
US 2020/0387004 A1 Dec. 10, 2020

Related U.S. Application Data

(63) Continuation of application No. PCT/CN2018/092838, filed on Jun. 26, 2018.

(30) Foreign Application Priority Data

Mar. 23, 2018 (CN) .......................... 201810244996.9

(51) Int. Cl.
*G02B 27/42* (2006.01)
*H04N 13/254* (2018.01)
(Continued)

(52) U.S. Cl.
CPC .......... *G02B 27/425* (2013.01); *G01B 11/254* (2013.01); *G02B 27/48* (2013.01); *H04N 13/254* (2018.05)

(58) Field of Classification Search
CPC .............. G01B 11/2513; G01B 11/254; G02B 27/425; G02B 27/48; G02B 27/4205;
(Continued)

(56) References Cited

U.S. PATENT DOCUMENTS 8,630,039 B2   1/2014 Shpunt
8,749,796 B2 * 6/2014 Pesach ................... G01B 11/25
                                                    356/610
(Continued)

FOREIGN PATENT DOCUMENTS

CN   101984767 A   3/2011
CN   102640087 A   8/2012
(Continued)

OTHER PUBLICATIONS

PCT International Search Report and the Written Opinion dated Sep. 27, 2018, issued in related International Application No. PCT/CN2018/092838, with partial English translation (9 pages).
(Continued)

*Primary Examiner* — Dakshesh D Parikh
(74) *Attorney, Agent, or Firm* — Sheppard Mullin Richter & Hampton LLP (57) ABSTRACT

A structured light projection module and a depth camera are provided. The structured light projection module includes: a light source array including a plurality of sub-light sources arranged in a two-dimensional pattern and configured to transmit array beams corresponding to the two-dimensional pattern; a lens configured to receive and converge the array beams; and a diffractive optical element configured to receive the array beams that are emitted after being converged by the lens and project beams in a structured light speckle pattern. The structured light speckle pattern is formed through staggered superposition of at least two secondary structured light speckle patterns. Each secondary structured light speckle pattern is formed through a tiling arrangement of multiple sub-speckle patterns generated by a portion of the sub-light sources, and comprises speckles formed by diffracting an individual sub-light source via the diffractive optical element.

17 Claims, 10 Drawing Sheets

(51) Int. Cl.
   *G01B 11/25* (2006.01)
   *G02B 27/48* (2006.01)
(58) Field of Classification Search
   CPC .. G03B 21/00; G03B 21/2033; H04N 13/254; H04N 2013/0081
   See application file for complete search history.

(56) References Cited

U.S. PATENT DOCUMENTS

| | | |
|---|---|---|
| 8,908,277 B2 | 12/2014 | Pesach et al. |
| 9,473,762 B2 | 10/2016 | Zierke et al. |
| 9,686,839 B1 | 6/2017 | Chern et al. |
| 9,915,827 B2 | 3/2018 | Gordon |
| 9,946,089 B2 | 4/2018 | Chen et al. |
| 10,247,547 B2 | 4/2019 | Thuries et al. |
| 2008/0240502 A1 | 10/2008 | Freedman et al. |
| 2009/0185274 A1 | 7/2009 | Shpunt |
| 2010/0007717 A1 | 1/2010 | Spektor et al. |
| 2010/0118123 A1 | 5/2010 | Freedman et al. |
| 2010/0284082 A1 | 11/2010 | Shpunt et al. |
| 2011/0188054 A1 | 8/2011 | Petronius et al. |
| 2012/0105855 A1 | 5/2012 | Miyasaka et al. |
| 2012/0236288 A1 | 9/2012 | Stanley |
| 2013/0038881 A1* | 2/2013 | Pesach ................. G02B 27/106 356/610 |
| 2013/0038941 A1 | 2/2013 | Pesach et al. |
| 2014/0211215 A1 | 7/2014 | Pesach et al. |
| 2015/0253123 A1* | 9/2015 | Braker ............... G01B 11/2531 356/610 |
| 2016/0025993 A1* | 1/2016 | Mor ..................... G06V 10/145 438/27 |
| 2016/0127713 A1 | 5/2016 | Hazeghi |
| 2016/0127714 A1 | 5/2016 | Hazeghi et al. |
| 2016/0377414 A1 | 12/2016 | Thuries et al. |
| 2017/0115497 A1* | 4/2017 | Chen .................... H04N 13/207 |
| 2017/0188016 A1 | 6/2017 | Hudman et al. |
| 2018/0038685 A1 | 2/2018 | Torri et al. |
| 2018/0100733 A1 | 4/2018 | Thuries et al. |
| 2019/0041197 A1 | 2/2019 | Gemoth et al. |
| 2019/0273905 A1 | 9/2019 | Wang et al. |
| 2019/0339541 A1 | 11/2019 | Xu et al. |

FOREIGN PATENT DOCUMENTS

| | | |
|---|---|---|
| CN | 103309137 A | 9/2013 |
| CN | 104519343 A | 4/2015 |
| CN | 104822060 A | 8/2015 |
| CN | 205002744 U | 1/2016 |
| CN | 105319811 A | 2/2016 |
| CN | 105530503 A | 4/2016 |
| CN | 105705964 A | 6/2016 |
| CN | 205350880 U | 6/2016 |
| CN | 106292144 A | 1/2017 |
| CN | 106406002 A | 2/2017 |
| CN | 106461378 A | 2/2017 |
| CN | 106569330 A | 4/2017 |
| CN | 106990548 A | 7/2017 |
| CN | 106990660 A | 7/2017 |
| CN | 107026392 A | 8/2017 |
| CN | 107424188 A | 12/2017 |
| CN | 107429993 A | 12/2017 |
| CN | 107450190 A | 12/2017 |
| CN | 206805630 U | 12/2017 |
| CN | 107589623 A | 1/2018 |
| CN | 206833079 U | 1/2018 |
| CN | 206908092 U | 1/2018 |
| CN | 107678225 A | 2/2018 |
| CN | 107703641 A | 2/2018 |
| CN | 107748475 A | 3/2018 |
| CN | 107908064 A | 4/2018 |
| CN | 108490634 A | 9/2018 |
| CN | 108490635 A | 9/2018 |
| EP | 2568355 A2 | 3/2013 |
| JP | 2014-035920 A | 2/2014 |
| WO | 2016/024200 A2 | 2/2016 |
| WO | 2016/138143 A1 | 9/2016 |
| WO | 2017/069954 A1 | 4/2017 |
| WO | 2017-204498 A1 | 11/2017 |

OTHER PUBLICATIONS

First Search dated Mar. 7, 2019, issued in related Chinese Patent Application No. 201810244996.9 (2 pages).
First Office Action dated Mar. 15, 2019, issued in related Chinese Patent Application No. 201810244996.9, with English machine translation (10 pages).
PCT International Search Report and the Written Opinion dated Dec. 6, 2018, issued in related International Application No. PCT/CN2018/092839, with partial English translation (11 pages).
First Search dated Mar. 26, 2019, issued in related Chinese Application No. 201810245379.0 (2 pages).
First Office Action dated Apr. 1, 2019, issued in related Chinese Application No. 201810245379.0, with English machine translation (10 pages).
First Search dated Apr. 23, 2019, issued in related Chinese Application No. 201710806581.1 (1 page).
First Office Action dated Apr. 30, 2019, issued in related Chinese Application No. 201710806581.1, with English machine translation (11 pages).
PCT International Search Report and the Written Opinion dated May 30, 2018, issued in related International Application No. PCT/CN2018/071985, with partial English translation (11 pages).
PCT International Preliminary Report on Patentability dated Mar. 19, 2020, issued in related International Application No. PCT/CN2018/071985, with English translation (11 pages).
Non-Final Office Action dated May 14, 2021, issued in related U.S. Appl. No. 16/510,446 (15 pages).
Final Office Action dated Aug. 27, 2021, issued in related U.S. Appl. No. 16/510,446 (17 pages).
Non-Final Office Action dated Jan. 26, 2022, issued in related U.S. Appl. No. 16/510,446 (15 pages).
Notice of Allowance dated May 11, 2022, issued in related U.S. Appl. No. 16/510,446 (8 pages).
Non-Final Office Action dated Apr. 30, 2021, issued in related U.S. Appl. No. 16/867,457 (13 pages).
Notice of Allowance dated Aug. 9, 2021, issued in related U.S. Appl. No. 16/867,457 (11 pages).
PCT International Preliminary Report on Patentability dated May 22, 2020, issued in related International Application No. PCT/CN2018/113778, with English translation (15 pages).
PCT International Preliminary Report on Patentability dated May 22, 2020, issued in related International Application No. PCT/CN2018/113780, with English translation (12 pages).
PCT International Search Report and the Written Opinion dated Jan. 30, 2019, issued in related International I Application No. PCT/CN2018/113778, with partial English translation (14 pages).
PCT International Search Report and the Written Opinion dated Jan. 30, 2019, issued in related International I Application No. PCT/CN2018/113780, with partial English translation (10 pages).
First Search dated Dec. 2, 2019, issued in related Chinese Patent Application No. 201711080702.5 (1 page).
First Office Action dated Dec. 10, 2019, issued in related Chinese Patent Application No. 201711080702.5, with English machine translation (13 pages).

* cited by examiner

STRUCTURED LIGHT PROJECTION MODULE AND DEPTH CAMERA

CROSS REFERENCE TO RELATED APPLICATIONS

The application is a continuation application of International Patent Application No. PCT/CN2018/092838, filed with the China National Intellectual Property Administration (CNIPA) on Jun. 26, 2018, and entitled "STRUCTURED LIGHT PROJECTION MODULE AND DEPTH CAMERA", which is based on and claims priority to and benefit of Chinese Patent Application No. 201810244996.9, filed with the CNIPA on Mar. 23, 2018. The entire contents of all of the above-identified applications are incorporated herein by reference.

TECHNICAL FIELD

The present specification relates to a structured light projection module and a depth camera.

BACKGROUND

A three-dimensional (3D) imaging technology is a core of a new generation human-computer interaction technology. As requirements of mobile terminal devices for the 3D imaging technology become mandatory, depth cameras will be widely applied to the mobile terminal devices, causing the depth camera to develop towards a direction of low power consumption, high performance, and a small volume.

A structured light projection module is a core device in the depth camera based on the structured light technology, and mainly uses light sources to emit beams and emits a structured light pattern outwards after the beams are modulated by an optical element. The size, power consumption and performance of the structured light projection module determine the volume, power consumption and performance of the depth camera. A structured light speckle (spot) pattern is widely applied as a mature projection solution at present. The principle of the projection solution is mainly to use a laser light source, a lens and a diffractive optical element (DOE), wherein the DOE can split incident beams to generate speckle-patterned beams to be emitted outwards in a specific distribution.

Factors such as the intensity and distribution of the structured light speckle pattern affect the calculation accuracy and the field-of-view angle of the depth image. A higher intensity may increase the contrast of the patterns to further increase the calculation accuracy. However, due to the problem of zero-order diffraction of the DOE, the intensity is required to be not excessively high to avoid the occurrence of safety problems of laser, and in Patent Application No. CN2008801199119, it is proposed that double DOEs are used to resolve the problem of zero-order diffraction. The distribution of the laser speckle pattern, such as density distribution and non-correlation (randomness) also affect the calculation accuracy. In addition, people also intend to achieve a projection of a larger field of view with less power consumption, such as using a smaller quantity of light sources to generate a structured light pattern as large as possible in a projection area.

However, in the current solution, it is difficult to achieve better uniformity in key indexes such as power consumption of the structured light projection module, density distribution of the projection pattern, and non-correlation.

SUMMARY

For the defects of the existing technologies, to resolve one or more of the foregoing problems, the present specification provides a structured light projection module and a depth camera having the structured light projection module.

To achieve the foregoing objectives, the following technical solutions are used in the present specification.

A structured light projection module includes: a light source array, including a plurality of sub-light sources arranged in a two-dimensional pattern and used for transmitting array beams corresponding to the two-dimensional pattern; a lens, used for receiving and converging the array beams; and a diffractive optical element, used for receiving the array beams emitted after being converged by the lens and projecting structured light speckle pattern beams. A structured light speckle pattern is formed through staggered superposition of at least two secondary structured light speckle patterns. The secondary structured light speckle pattern is formed through a tiling arrangement of a plurality of sub-speckle patterns generated by several sub-light sources among the plurality of sub-light sources. The sub-speckle pattern is composed of speckles in different diffraction orders formed after a single sub-light source is diffracted by the diffractive optical element.

In one aspect, a structured light projection module comprises: a light source array, comprising a plurality of sub-light sources arranged in a two-dimensional pattern and configured to transmit array beams corresponding to the two-dimensional pattern; a lens configured to receive and converge the array beams; and a diffractive optical element (DOE) configured to receive the array beams that are emitted after being converged by the lens and project beams in a structured light speckle pattern. The structured light speckle pattern is formed through staggered superposition of at least two secondary structured light speckle patterns, each of the at least two secondary structured light speckle pattern is formed through a tiling arrangement of multiple sub-speckle patterns generated by a portion of the plurality of sub-light sources, and the multiple sub-speckle patterns comprise speckles in different diffraction orders formed by diffracting an individual sub-light source via the diffractive optical element.

In some embodiments, the tiling arrangement comprises arranging the multiple sub-speckle patterns in a plane such that the multiple sub-speckle patterns are immediately adjacent to each other.

In some other embodiments, the tiling arrangement comprises arranging the multiple sub-speckle patterns in a plane such that a gap is left between two adjacent sub-speckle patterns.

In some embodiments, edges of the multiple sub-speckle patterns are non-linear and coupled to each other.

In some embodiments, the two-dimensional pattern is a regular arrangement pattern.

In some embodiments, an arrangement of the speckles in each of the multiple sub-speckle patterns is an irregular arrangement.

In some embodiments, the staggered superposition is staggered in a first direction and/or a second direction perpendicular to the first direction.

In some embodiments, the light source array further includes a substrate, and the plurality of sub-light sources is disposed on the substrate.

In some embodiments, each of the plurality of sub-light sources comprises a vertical-cavity surface-emitting laser.

In another aspect, a structured light projection module comprises: a light source array, comprising a plurality of sub-light sources arranged in a two-dimensional pattern and configured to transmit array beams corresponding to the two-dimensional pattern; a lens configured to receive and converge the array beams; and a diffractive optical element (DOE) configured to receive the array beams that are emitted after being converged by the lens and project beams in a structured light speckle pattern. The structured light speckle pattern is formed through staggered superposition of at least two secondary structured light speckle patterns, each of the at least two secondary structured light speckle pattern is formed through a tiling arrangement of multiple sub-speckle patterns that comprises speckles in a same diffraction order, and the speckles in the same diffraction order are formed by diffracting at least a portion of the plurality of sub-light sources via the diffractive optical element.

The present specification further provides a depth camera, including: the foregoing structured light projection module, used for projecting a structured light pattern into a space; a collecting module, used for obtaining the structured light pattern; and a processor, used for receiving the structured light pattern and calculating a depth image.

Beneficial effects of the present specification are as follows: the structured light speckle pattern is formed through the staggered superposition of at least two secondary structured light speckle patterns, and each secondary structured light speckle pattern is formed through the tiling arrangement of the plurality of sub-speckle patterns generated by several sub-light sources among the plurality of sub-light sources, to ensure the uniform distribution of the structured light patterns, thereby improving the density distribution of the structured light speckle patterns and also increasing non-correlation.

DETAILED DESCRIPTION OF THE APPLICATION

The following describes the implementations of the present specification in detail. It should be noted that the following description is merely an example and does not limit the scope and application of the present specification.

Figure 1:
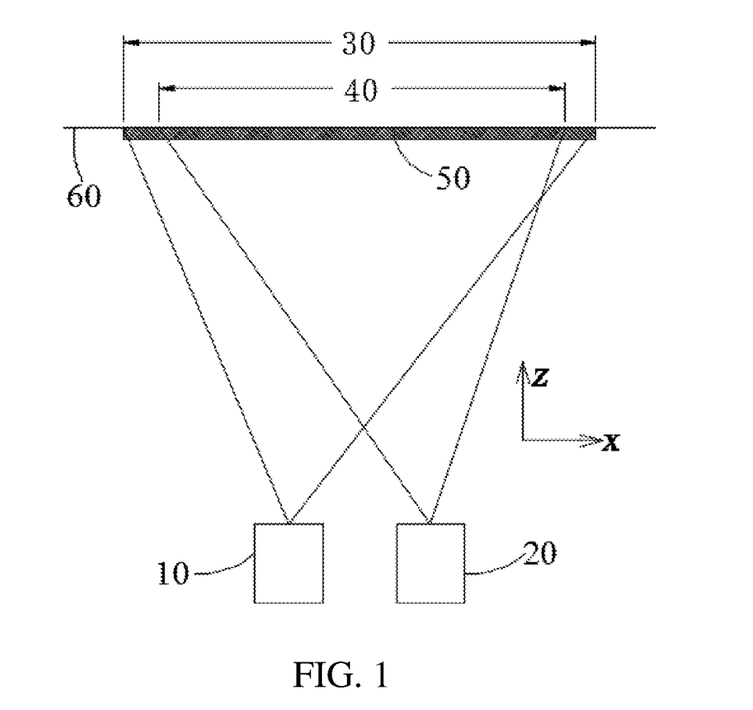
FIG. 1 is a principle diagram of a structured light depth camera, according to an embodiment of the present specification.

FIG. 1 is a principle diagram of a structured light depth camera, according to an embodiment of the present specification. The depth camera includes a structured light projection module 10 and a collecting module 20. The structured light projection module 10 is used for projecting a structured light beam into a space, and when the structured light beam is irradiated on a plane 60, a structured light pattern 50 is generated in an area 30. The collecting module 20 is used for collecting a structured light image on an object in a collecting area 40 of the collecting module 20. Generally, a projection area 30 is not smaller than the collecting area 40, thereby ensuring that all objects in the collecting area corresponding to the collecting module can be covered by the structured light pattern.

When the structured light pattern is irradiated on an object surface, the three-dimensional shape of the object surface will deform the structured light pattern relative to a preset pattern, and a correspondence exists between a deformation amplitude and a depth of the object. Therefore, when depth calculation is performed, matching calculation is first performed between the structured light pattern reflected by the object and the preset pattern (a reference structured light image/pattern). The matching calculation herein means that a sub-area of a certain size, such as a sub-area of 7×7 or 11×11 pixels, is selected on a current structured light image (or a reference structured light image) centering on a certain pixel. Then a sub-area most similar to the sub-area is searched for on the reference structured light image (or the current structured light image). The difference between pixel coordinates of two sub-areas on two images is a deviation value. Next, by utilizing a correspondence between the deviation value and a depth value, the depth value can be calculated based on the deviation value, and depth values of a plurality of pixels form a depth image. The deviation value herein generally refers to a deviation value along a baseline direction, and a baseline refers to a connection line between the structured light projection module 10 and the collecting module 20. In the present specification, an example of taking the baseline direction as an x direction for description is provided. Therefore, the structured light image is generally required to have very high non-correlation along the baseline direction to prevent mismatching.

In some embodiments, the structured light depth camera may include two or more collecting modules 20, for example, two collecting modules. The structured light projection module 10 projects structured light patterns to field-of-view areas of the two collecting modules 20 (left and right), and the left and right collecting modules 20 simultaneously obtain left and right structured light images respectively. The depth image may be obtained by calculating the left and right structured light images based on a binocular vision algorithm. Two depth images may be respectively obtained by calculating the left and right structured light images and their respective corresponding reference structured light images. The advantage of this is that, in an embodiment, the left and right collecting modules may be set to have different parameters, such as resolution or focal length. Therefore, the structured light images having, for example, different resolution or field-of-view angles may be collected simultaneously, and the depth images having different resolution, field-of-view angles or the like may be obtained simultaneously. In an embodiment, a plurality of obtained depth images may be further fused into a depth image having more information.

The depth calculation may be performed by a depth calculation processor configured within the depth camera. The processor may be a dedicated processor such as an SOC or an FPGA, or may be a general-purpose processor. In some embodiments, an external computing device such as a computer, a mobile terminal, or a server may be used. The external computing device performs the depth calculation after receiving the structured light image from the collecting module 20, and the obtained depth image may be directly used for other applications of the device.

In an embodiment, the structured light projection module is used for projecting an infrared speckle pattern. The collecting module is a corresponding infrared camera. The processor is a dedicated SOC chip. When the depth camera is integrated as an embedded apparatus into another computing terminal such as a computer, a tablet, a mobile phone, or a television, the function performed by the processor described above may be implemented by a processor or an application in the terminal. For example, the depth calculation function is stored in a memory in the form of a software module and invoked by the processor in the terminal, so as to implement the depth calculation.

The structured light pattern may be a stripe pattern, a two-dimensional pattern, a spot pattern (a speckle pattern), or the like. In the present specification, description uses the structured light projection module for transmitting the speckle pattern and the depth camera thereof as an example, and other types of projection modules and depth cameras thereof may also utilize the idea of the present specification.

Figure 2:
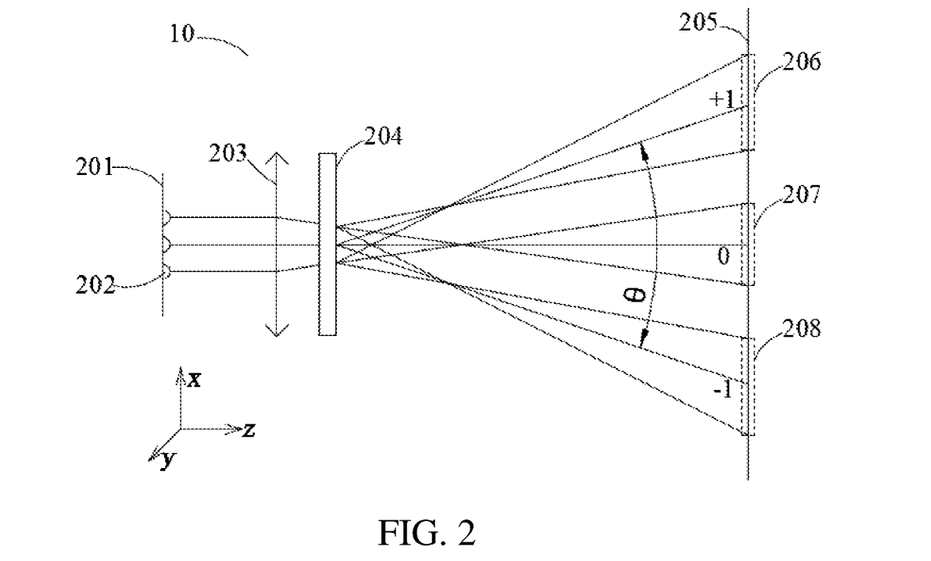
FIG. 2 is a schematic diagram of a structured light projection module, according to an embodiment of the present specification.

FIG. 2 is a schematic diagram of a structured light projection module, according to an embodiment of the present specification. The structured light projection module 10 includes a light source array 201 (for example, a vertical-cavity surface-emitting laser array chip, namely, a VCSEL array chip) composed of a plurality of sub-light sources 202, a lens 203, and a diffractive optical element DOE 204. For ease of illustration, only three sub-light sources are shown in the one-dimensional×direction in the figure. In a practical embodiment, the quantity of light sources may be tens or even tens of thousands. The light sources may be in a two-dimension arrangement, and the arrangement may be regular or irregular.

Beams emitted by the light source array 201 may form a patterned beam corresponding to the light source arrangement, the patterned beam is incident on the DOE 204 after being converged by the lens 203. The DOE 204 projects the speckle patterned beam into a space, and the speckle patterned beam is incident on a plane 205 to form a speckle pattern. Convergence herein means that the lens 203 converges an incident beam with a certain divergence angle and then emits it as an outgoing beam with a smaller divergence angle. Only a single line is used for representing the propagation of a single beam in the figure. For brevity, a width of the beam and effects such as the convergence are not shown. The lens 203 may be a single lens, or may be a lens combination including a plurality of lenses or a lens array, and in some embodiments, may be used for collimating the beam emitted by the light source 201.

Because the sub-light sources may be considered as non-correlated light sources, and the interference effect between the sub-light sources may be ignored, the speckle pattern emitted by the projection module 10 satisfies a linear condition. That is, the speckle pattern formed by the projection module 10 may be considered to be formed by superposing the sub-speckle patterns that are independently formed by the beams emitted by the sub-light sources of the light source 201 after passing through the DOE 204.

For brevity, in the embodiment shown in FIG. 2, only a case in which the DOE 204 forms three diffraction orders (for example, order −1, order 0, and order 1, or other diffraction orders) in the x direction for the incident beam is analyzed, and more diffraction orders in the x direction and y direction may be actually formed. The DOE 204 receives the beam from the lens 203 and then diffracts it so as to form three diffraction orders within the range of a diffraction angle θ, and patterns formed in all diffraction orders are the sub-speckle patterns of the sub-light sources. In this embodiment, through a comprehensive design (including the DOE diffraction angle, an included angle between neighboring diffraction orders, the size of the light source array, the focal length of the lens, and incident angles of the sub-light sources relative to the DOE) for the DOE diffraction angle θ and the size of the light source array, so that the sub-speckle patterns of the plurality of sub-light sources intersect with each other, and speckles of a same order in different sub-speckle patterns are focused together to form a speckle block. In the figure, speckles in diffraction order 1 forms a speckle block 206, speckles in diffraction order 0 forms a speckle block 207, and speckles in diffraction order −1 forms a speckle block 208. A plurality of speckle blocks is in a tiling arrangement together to form a structured light speckle pattern. As shown in FIG. 2, it can be understood that an arrangement of speckles in each speckle block and an arrangement of the sub-light sources 202 in the light source 201 correspond to each other, for example, both having a same arrangement pattern or in a central symmetry relationship. In addition, an arrangement manner of the speckle blocks is the same as that of the speckles in the sub-speckle pattern.

To make the speckles in the structured light speckle pattern have relatively uniform distribution density and satisfactory non-correlation, on one hand, the arrangement of the sub-light sources 202 is designated so that the speckle arrangement inside the speckle block 206 satisfies the non-correlation. On the other hand, the DOE 204 is designated so that the speckle blocks 206 are in a tiling arrangement, to ensure that all speckle blocks can cover the whole projection area.

Figure 4:
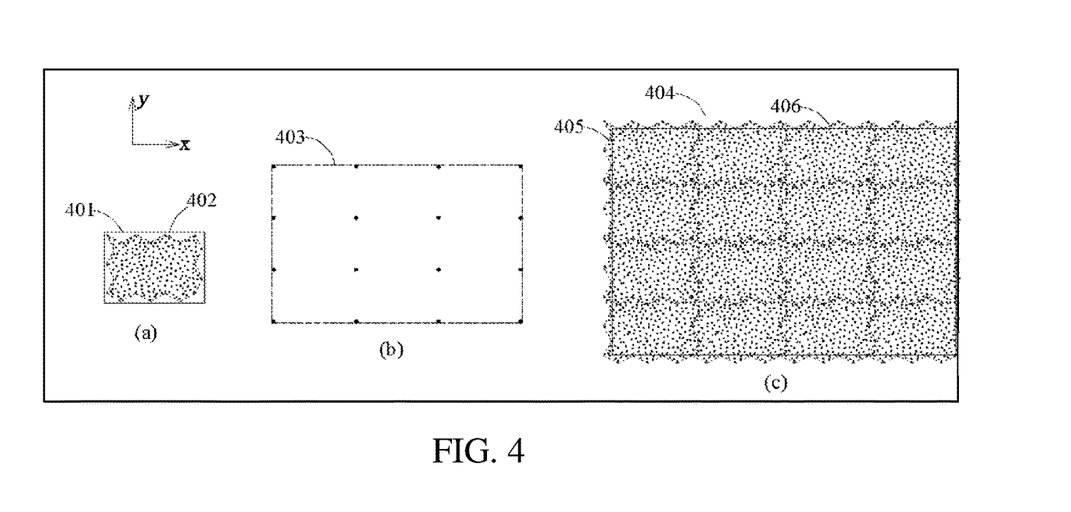
FIG. 4 is a schematic diagram of an arrangement of light sources, a sub-speckle pattern, and a structured light speckle pattern, according to an embodiment of the present specification.

FIG. 4 is a schematic diagram of a light source arrangement, a sub-speckle pattern, and a structured light speckle pattern, according to an embodiment of the present specification. FIG. 4(a), FIG. 4(b) and FIG. 4(c) respectively correspond to the light source 201 in the projection module 10 in the embodiment shown in FIG. 2, the sub-speckle pattern formed by the single beam passing through the DOE 204, and the structured light speckle pattern. In FIG. 4(*a*), the light source includes a substrate 401 and a light source array formed by the sub-light sources 402 disposed on the substrate 401. In this embodiment, the sub-light sources in the array of the sub-light sources 402 is an irregular arrangement, but the speckles in the sub-speckle pattern are regularly distributed, so that the speckle blocks 405 in a final formed structured light pattern may be the same regular arrangement as that of the speckles in the sub-speckle pattern. In this embodiment, the contour of the arrangement pattern formed by the sub-light sources 402 (the contour is represented by a dotted line in the figure, and the contour line may not be included in an actual product) is an irregular contour, and therefore, a contour of the speckle blocks 405 is also an irregular contour. The speckle blocks 405 are arranged immediately adjacent to each other in a tiling manner to form a structured light speckle pattern 404, so that edges of neighboring speckle blocks 405 are irregular (an undulating non-linear shape is shown in FIG. 4), and neighboring speckle blocks are coupled to each other (it should be noted that, the actual structured light speckle pattern may be deformed by distortion of the lens and may not be in an ideal situation shown in the figure). The contours of the speckle blocks 405 are all non-linear in an x direction and/or in a y direction. It can be understood that, because the edges of neighboring speckle blocks are non-linear, the contours inevitably do not coincide with the baseline, that is, they are inconsistent with the baseline direction x. Compared with a case in which the arrangement pattern of the sub-light sources 402 is arranged in a square shape, the arrangement manner in which the blocks are coupled to each other when the contours are non-linear can further improve the non-correlation and density uniformity of the speckles at boundaries of adjacent blocks. In FIG. 4(*c*), a plurality of speckle blocks 405 are arranged immediately adjacent to each other in a tiling arrangement manner to form the structured light speckle pattern 404. For ease of showing connections between the speckle blocks 405, the dotted lines are drawn to represent the contours, such that a higher density at boundaries is shown in the figure. However, no dotted lines are in actual patterns, and the density of the boundaries is relatively uniform.

It can be learned from FIG. 4(*c*) that, the randomness of the speckle distribution at the boundaries of immediately adjacent blocks can be improved by the arrangement manner of coupling the adjacent non-linear contours to each other, but the disadvantage is that non-linear undulating contours also appear at the edges of the structured light speckle pattern. Because the field of view of the collecting module usually is a square shape (herein, analysis is still performed in ideal cases, and image distortion is ignored), an effective area 406 of the structured light speckle pattern is smaller than the whole structured light speckle pattern 404 composed of all the speckle blocks 405.

Figure 3:
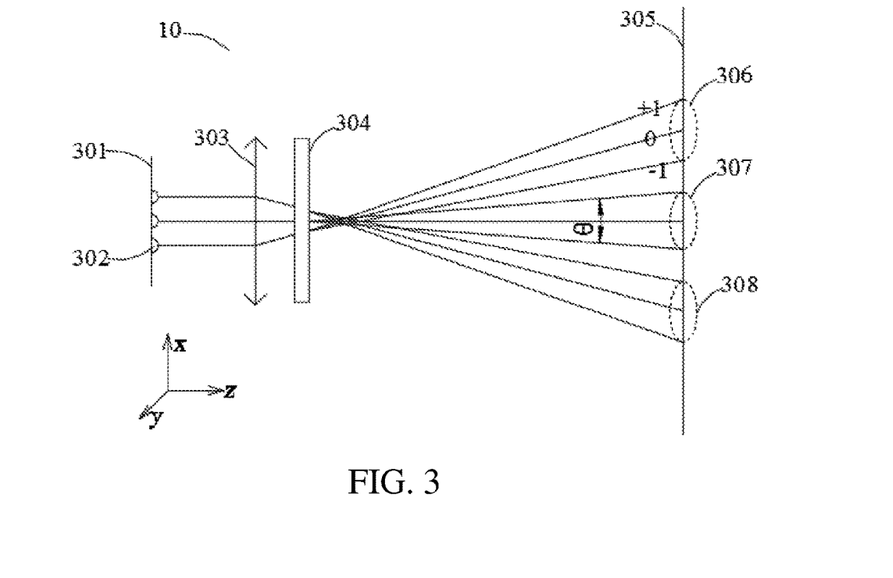
FIG. 3 is a schematic diagram of a structured light projection module, according to another embodiment of the present specification.

FIG. 3 is a schematic diagram of a structured light projection module, according to another embodiment of the present specification. A light source array 301 including a plurality of sub-light sources 302 emits beams, and a structured light speckle pattern is emitted onto a plane 305 after the beams are converged by a lens 303 and incident upon a DOE 304. A difference from the embodiment shown in FIG. 2 is that a diffraction angle θ of the DOE 304 is smaller, so that the sub-speckle patterns formed after the beams are emitted by each sub-light source and are diffracted through the DOE 304 do not intersect with each other, that is, directly form a speckle block. As shown in FIG. 3, sub-speckle patterns formed by speckles in different diffraction orders and formed by diffracting sub-light sources 3021, 3022, and 3023 via the DOE 304 are 308, 307 and 306, respectively. A difference from the embodiment shown in FIG. 2 is that a plurality of sub-speckle patterns does not intersect with each other and constitutes the structured light speckle pattern together. It can be learned from FIG. 3 that the arrangement of the plurality of sub-speckle patterns corresponds to the arrangement of the sub-light sources 302.

Figure 5:
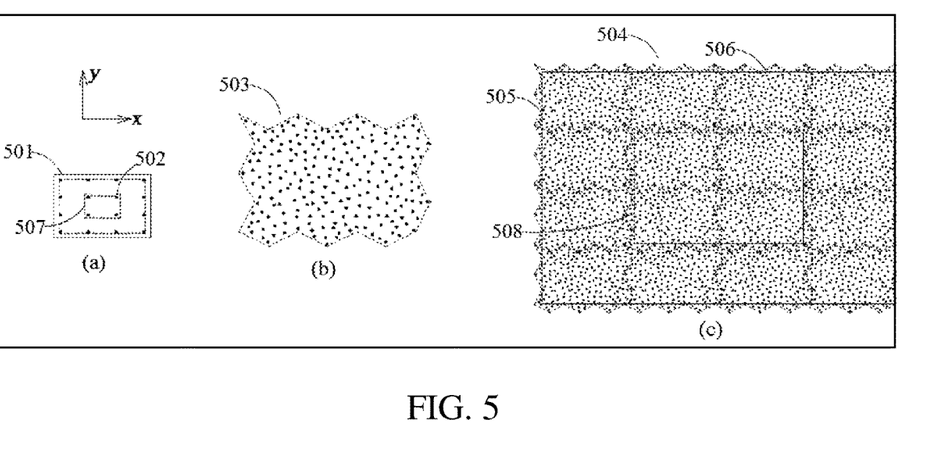
FIG. 5 is a schematic diagram of an arrangement of light sources, a sub-speckle pattern, and a structured light speckle pattern, according to another embodiment of the present specification.

FIG. 5 is a schematic diagram of a light source arrangement, a sub-speckle pattern, and a structured light speckle pattern, according to another embodiment of the present specification. FIG. 5(*a*), FIG. 5(*b*) and FIG. 5(*c*) respectively correspond to the light source 301 in the projection module 10 in the embodiment shown in FIG. 3, the sub-speckle pattern formed by the single beam passing through the DOE 304, and the structured light speckle pattern. The light source in FIG. 5(*a*) includes a substrate 501 and sub-light sources 502, and the sub-light sources 502 are regularly arranged, so that the sub-speckle patterns cover the projection area in a tiling arrangement by a corresponding regular arrangement to form a structured light speckle pattern as shown in FIG. 5(*c*). FIG. 5(*b*) is a sub-speckle pattern 503 including speckles in a plurality of diffraction orders after beams are emitted by individual sub-light sources and then diffracted by the DOE 304. FIG. 5(*c*) shows a structured light speckle pattern 504, and the pattern includes a plurality of sub-speckle patterns 505 (namely, sub-speckle patterns 503). An arrangement of the sub-speckle patterns 505 corresponds to an arrangement of the sub-light sources 502. In this embodiment, in order to make the structured light speckle pattern satisfy the non-correlation characteristic, an arrangement of the speckles in the sub-speckle pattern (speckle block) 503 is an irregular arrangement. This requirement can be achieved by designing the DOE 304, so that the included angles of beams in neighboring diffraction orders are not uniformly distributed. In this embodiment, a contour of the sub-speckle pattern 503 is non-linear in an x direction and/or in a y direction, and adjacent sub-speckle patterns are coupled to each other to form the structured light speckle pattern.

It should be noted that the patterns shown in FIG. 4 and FIG. 5 are examples. The proportion of the patterns does not strictly follow the actual product designs. The tiling arrangement manner herein is that a plurality of sub-patterns is arranged in a non-overlapping manner, and final patterns are formed to basically cover the field-of-view area. In addition to arranging the sub-patterns immediately adjacent to each other, the tiling arrangement manner further includes a certain gap between adjacent sub-patterns. Details can be seen in the following embodiments.

Figure 6:
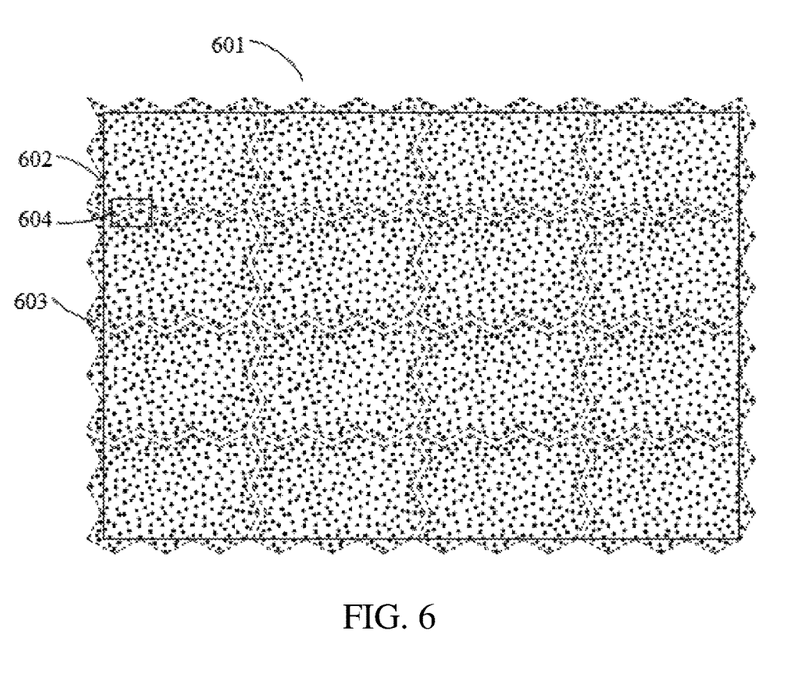
FIG. 6 is a schematic diagram of a structured light speckle pattern, according to an embodiment of the present specification.

FIG. 6 is a schematic diagram of a structured light speckle pattern, according to an embodiment of the present specification. In some embodiments, when a structured light speckle pattern 601 is formed by a plurality of speckle blocks 602 (or sub-speckle patterns) in a tiling arrangement manner, adjacent blocks are not connected when coupled to each other, but are staggered by a certain gap 603, so as to further enlarge the projection area of the projection module. However, a larger gap is not better. It can be understood that, when the gap is increased, a blank area in the sub-area is also larger when matching calculation is performed. Therefore, the accuracy of the depth value is decreased or the depth value cannot be calculated, as shown in a sub-area 903 and a sub-area 906 in FIG. 9, and there are only a few speckles in the area. Therefore, the size of the gap is generally configured with reference to the size of sub-area 604 in the depth calculation algorithm.

When an edge shape of the speckle block 602 is non-linear, because the sub-area 604 is generally in a rectangular shape, that is, an edge of the sub-area is linear. The speckles in neighboring speckle blocks can be all included in the sub-area 604 when the sub-area selection and matching calculation are performed on pixels around the gap, thereby improving the non-correlation of the sub-areas around the gap. When the edge of the speckle block 602 is linear, a large quantity of sub-areas including speckles in a single block and the blank gap may exist around the gap. In this case, the non-correlation of a speckle arrangement in the sub-area is lower.

Figure 9:
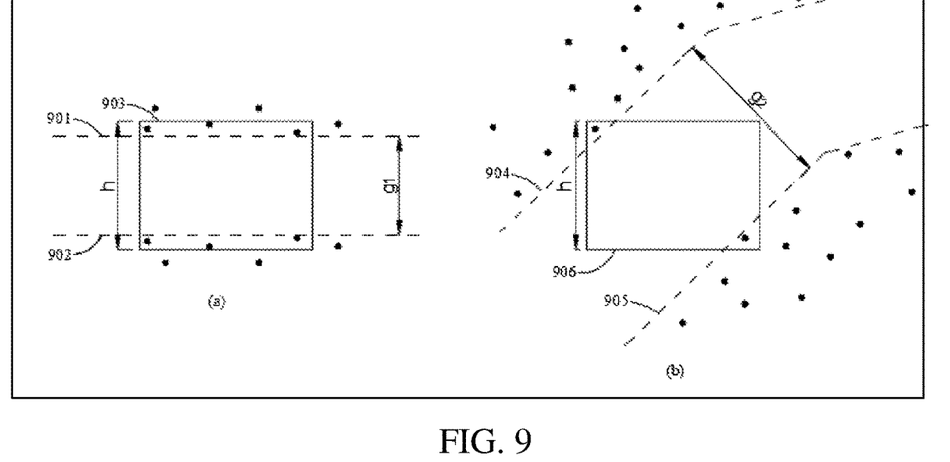
FIG. 9 is a schematic diagram of a relationship between a sub-area and a block gap, according to an embodiment of the present specification.

An irregularly edged shape can further increase the area of the projection area in addition to improving the non-correlation of the sub-area. FIG. 9 is a schematic diagram of a relationship between a sub-area and a block gap, according to an embodiment of the present specification. When the size of the sub-area is fixed (the size of the sub-area determines the accuracy and efficiency of the depth calculation algorithm, and therefore, a compromise value is generally selected), for the case where the speckle blocks are in a square shape, as shown in FIG. 9(*a*), neighboring speckle blocks 901 and 902 are in the square shape, contours of the speckle blocks are parallel to one edge of the sub-area, to ensure the speckles exist in the sub-area, a side-length h of the sub-area is theoretically not less than a gap g1 between neighboring speckle blocks (which is actually far less than the side-length of the sub-area, for example, is set to half of the side length), that is, h≥g1. However, when the contour of speckle blocks is non-linear edged, as shown in FIG. 9(*b*), a gap g2 between neighboring speckle blocks is unnecessarily required to be less than the side-length h of the sub-area. It is obvious that g2>g1 by comparing FIG. 9(*a*) with FIG. 9(*b*). That is, for speckle blocks whose contour is non-linear, when the size of the sub-area is fixed, the gap between the neighboring speckle blocks is relatively larger. Therefore, a larger field of view may be obtained. On the contrary, when the gaps are the same, and matching calculation is performed on the structured light speckle pattern including the speckle blocks with non-linear contour, a smaller matching sub-area may be adopted, so that the speed of the matching calculation can be accelerated, thereby increasing an output frame rate of the depth image.

Figure 7:
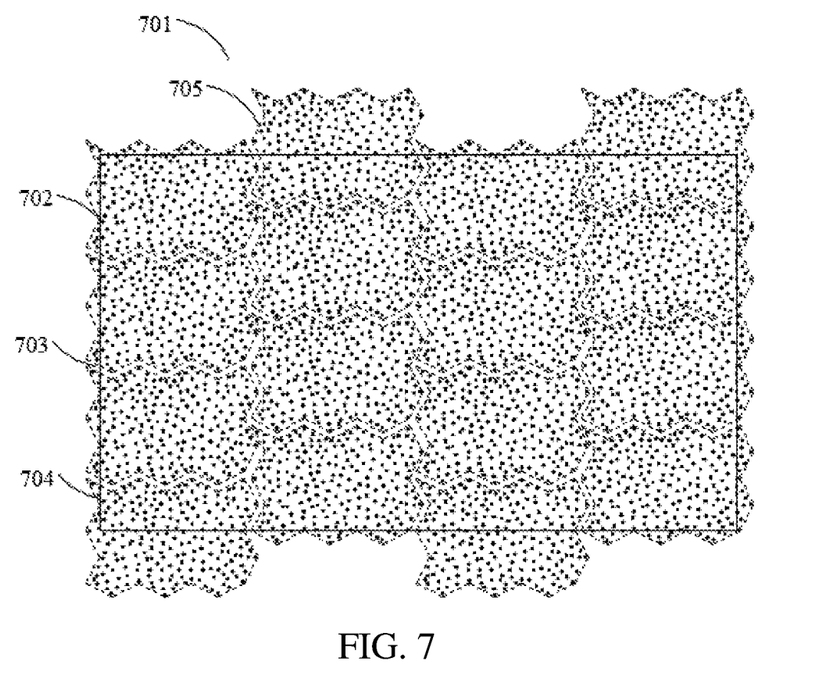
FIG. 7 is a schematic diagram of a structured light speckle pattern in a staggered arrangement, according to an embodiment of the present specification.

To further improve the non-correlation of the pattern, the neighboring speckle blocks may be further staggered from each other in the arrangement as shown in FIG. 7. In FIG. 7, neighboring speckle blocks 702 and 705 are staggered in arrangement along the y direction. Therefore, the non-correlation between blocks in a baseline direction x can be improved. In the embodiment shown in FIG. 7, a gap 703 exists between neighboring blocks. It can be understood that, a staggered arrangement solution may be used in an embodiment without gap.

Figure 8:
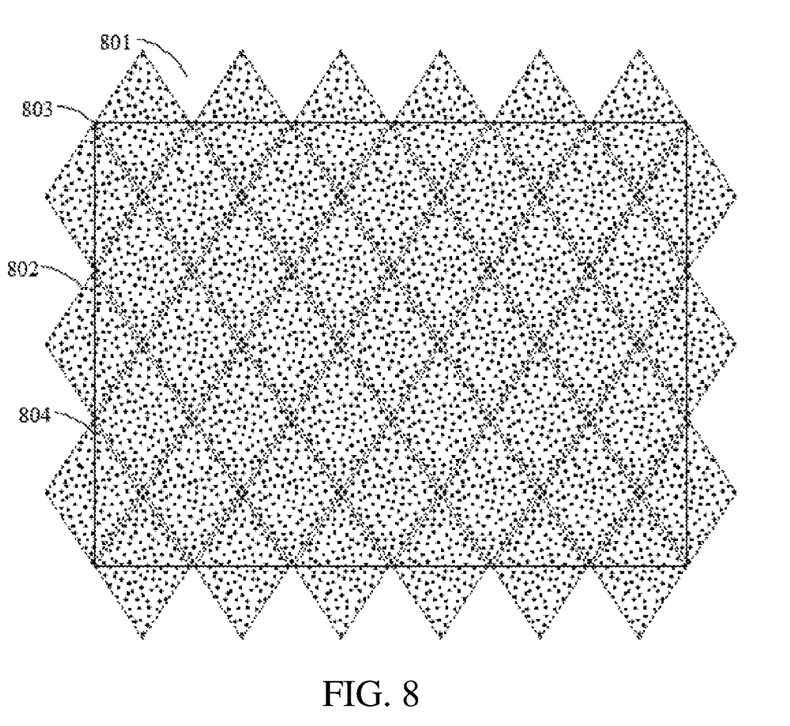
FIG. 8 is a schematic diagram of a structured light pattern, according to another embodiment of the present specification.

In the embodiments shown in FIG. 4 and FIG. 5, in FIG. 4, an arrangement pattern of the sub-light sources has non-linear edges, and in FIG. 5, the sub-speckle pattern has non-linear edges, so that neighboring blocks of a plurality of blocks constituting the structured light speckle pattern are coupled to each other, thereby improving the non-correlation of the structured light speckle pattern. There may also be many other forms in addition to the speckle pattern form shown in the figures, such as wavy edges. It can be understood that, when the edge is non-linear, neighboring edges of the neighboring blocks are inevitably inconsistent with the baseline direction, and the neighboring edges of the neighboring blocks may be coupled to each other. In addition, when the edges are linear, the neighboring edges of the neighboring blocks may be inconsistent with the baseline direction, and the neighboring edges of the neighboring blocks are coupled to each other. For example, FIG. 8 is a schematic diagram of a structured light pattern, according to another embodiment of the present specification. A structured light pattern 801 includes a plurality of speckle blocks 802 (or sub-speckle patterns). The speckle blocks are in a prism shape. Neighboring blocks are coupled to each other. A sub-area is randomly selected at the periphery of any gap in an effective area 803, and each sub-area includes speckles of at least two blocks. Therefore, the structured light speckle pattern has higher non-correlation.

In some applications, depth images with high resolution are usually required to be obtained. In this case, projecting higher density speckle patterns will facilitate to obtain a high resolution depth image.

Figure 10:
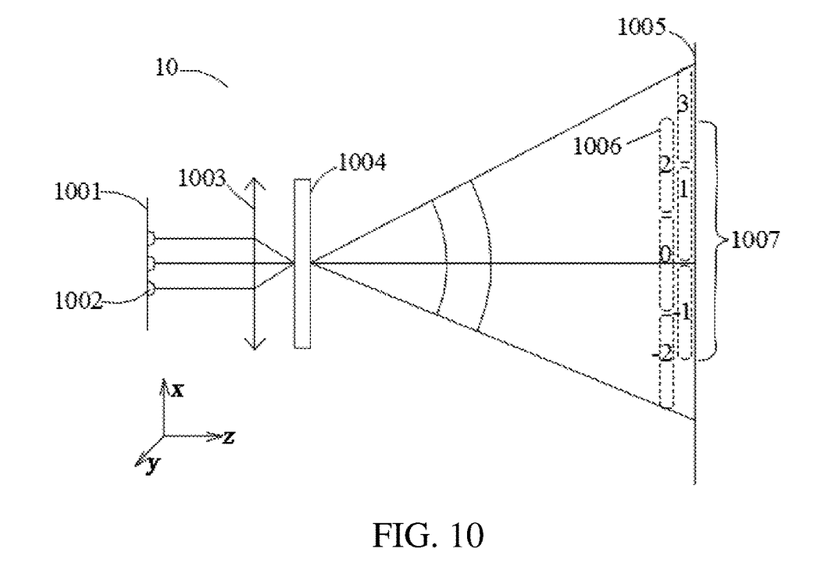
FIG. 10 is a schematic diagram of a structured light projection module that projects a high density pattern, according to an embodiment of the present specification.

FIG. 10 is a schematic diagram of a structured light projection module projecting a high density pattern, according to an embodiment of the present specification. A projection module 10 includes a light source array 1001 formed by a plurality of sub-light sources 1002, a lens 1003, and a DOE 1004. A difference from the embodiment shown in FIG. 2 is that, the structured light speckle pattern formed by beams emitted by the DOE 1004 and then projected onto a plane 1005 has a higher density than the structured light speckle pattern in FIG. 2. The speckle block including speckles in the same diffraction order in FIG. 2 forms the structured light speckle pattern in the tiling arrangement (in the arrangement of immediately adjacent or spacing with a an appropriate gap). However, in this embodiment, the distribution density of the speckles can be increased by overlapping the speckles with each other. FIG. 10 exemplarily shows a structured light speckle pattern formed by overlapping speckle blocks 1006 of six different diffraction orders (for example, orders −2, −1, 0, 1, 2, 3).

Actually, not any form of overlapping can generate the structured light speckle pattern that may be used for depth calculation. This is due to that, for the depth image to be calculated, the density distribution of the structured light speckle pattern may affect the non-correlation of the structured light speckle pattern, and may further affect the calculation of the depth image, so that the structured light speckle pattern having relatively uniform density distribution is the most ideal pattern. Therefore, while increasing the pattern density by overlapping, the density distribution is also required to be uniform as much as possible.

To make the pattern density relatively uniform, the present specification provides an overlapping solution. For ease of showing the overlapping solution, the speckle blocks 1006 in a plurality of different diffraction orders on the plane 1005 are staggered in a z direction in the figure. It can be understood that all speckle blocks are actually formed on the plane 1005. In the embodiment shown in FIG. 10, three speckle blocks in diffraction orders 2, 0, and −2 are adjacent to each other to form a first secondary structured light speckle pattern, and three speckle blocks in diffraction orders 3, 1, and −1 are adjacent to each other to form a second secondary structured light speckle pattern. The first secondary structured light speckle pattern and the second secondary structured light speckle pattern are staggered by a certain distance and overlapped with each other. An overlapping area of the two secondary structured light speckle patterns is 1007. The area is also an effective projection area of a projector 10. The density of a non-overlapping edge area is lower than the density of the overlapping area. Because each secondary structured light speckle pattern is formed by a plurality of speckle blocks adjacent to each other, the density distribution of the secondary structured light speckle pattern is relatively uniform. After a plurality of uniform secondary structured light speckle patterns overlaps in a staggered superposition manner, the density distribution of the speckle patterns in the overlapping area is also relatively uniform. Therefore, the overlapping solution is beneficial to generation of the structured light speckle pattern with relatively uniform density distribution.

Figure 11:
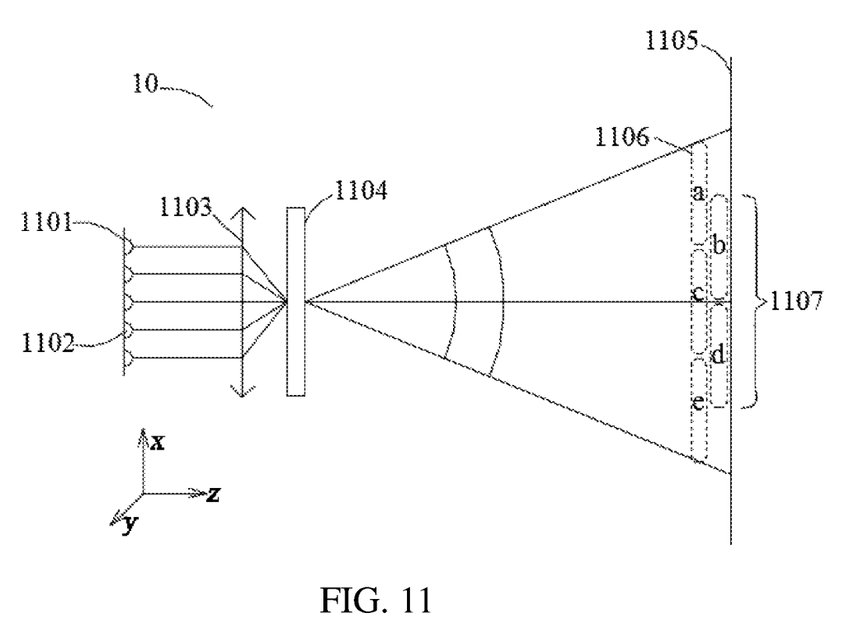
FIG. 11 is a schematic diagram of a structured light projection module that projects a high density pattern, according to another embodiment of the present specification.
Figure 12:
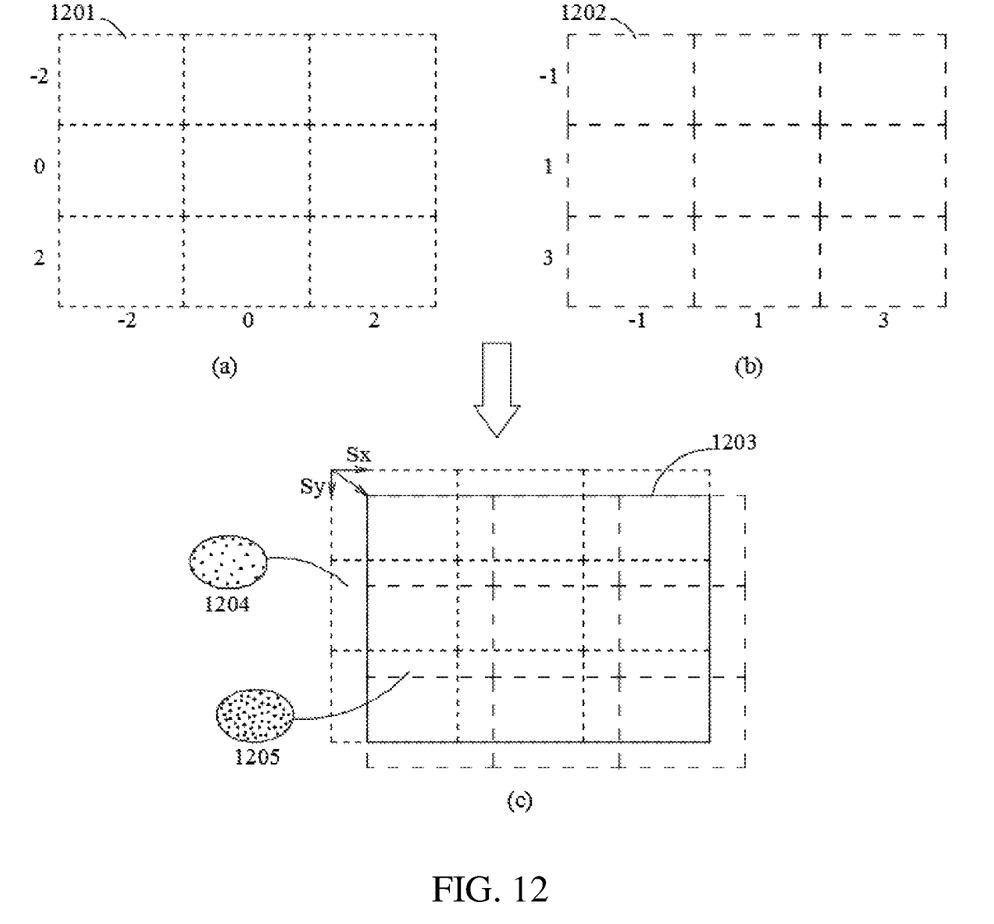
FIG. 12 is a schematic diagram of overlapping patterns, according to an embodiment of the present specification.

FIG. 12 is a schematic diagram of overlapping patterns, according to an embodiment of the present specification. FIG. 11 only exemplarily shows an overlapping solution in one dimension. For further exemplary description, FIG. 12 shows an overlapping solution in two dimensions. FIG. 12(a) shows a first secondary structured light speckle pattern 1201 formed by speckle blocks in nine different diffraction orders (corresponding to a horizontal coordinate and a vertical coordinate in the figure). FIG. 12(b) shows a second secondary structured light speckle pattern 1202 formed by nine speckle blocks. FIG. 12(c) shows a structured light speckle pattern formed by a first secondary structured light speckle pattern and a second secondary structured light speckle pattern that are in a staggered arrangement. The second secondary structured light speckle pattern is staggered from the first secondary structured light speckle pattern by distances Sx and Sy in a first direction (x) and a second direction (y) perpendicular to the first direction respectively. It can be understood that two secondary structured light speckle patterns may be staggered by a certain distance either along the x direction or the y direction to achieve mutual overlapping. When the two secondary structured light speckle patterns overlap in a single direction (for example, the x direction or the y direction), the density in the corresponding direction is increased. The density of an overlapping area 1203 is increased compared to the density of a non-overlapping area at an edge, such as the pattern density distributions shown in enlarged illustrations 1204 and 1205, and the overlapping area 1203 is an effective projection area.

Figure 13:
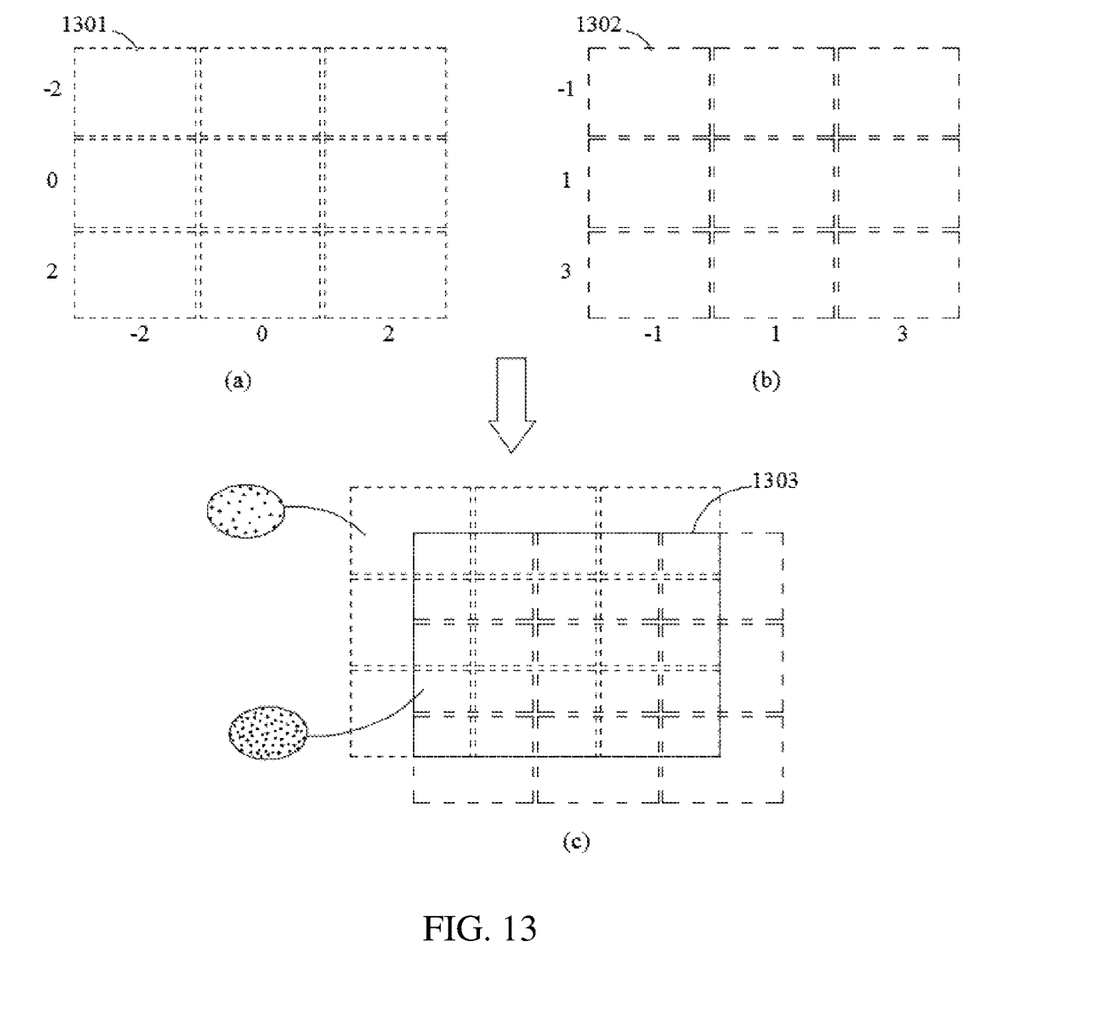
FIG. 13 is a schematic diagram of overlapping patterns, according to another embodiment of the present specification.

In the embodiment shown in FIG. 12, the secondary structured light speckle pattern is formed by connecting edges of the speckle blocks adjacent to each other. FIG. 13 shows an embodiment of another overlapping solution. In this embodiment, a certain gap is set between speckle blocks in a secondary structured light speckle pattern, so as to increase a projection area. FIG. 13(a) shows a first secondary structured light speckle pattern 1301 formed by speckle blocks in nine different diffraction orders (corresponding to a horizontal coordinate and a vertical coordinate in the figure). FIG. 13(b) shows a second secondary structured light speckle pattern 1302 formed by nine speckle blocks. FIG. 13(c) shows a structured light speckle pattern formed by the first secondary structured light speckle pattern and the second secondary structured light speckle pattern that are in a staggered arrangement. It can be learned from the figure that the first secondary structured light speckle pattern and the second secondary structured light speckle pattern are both formed by a plurality speckle blocks arranged with a certain gap.

Figure 14:
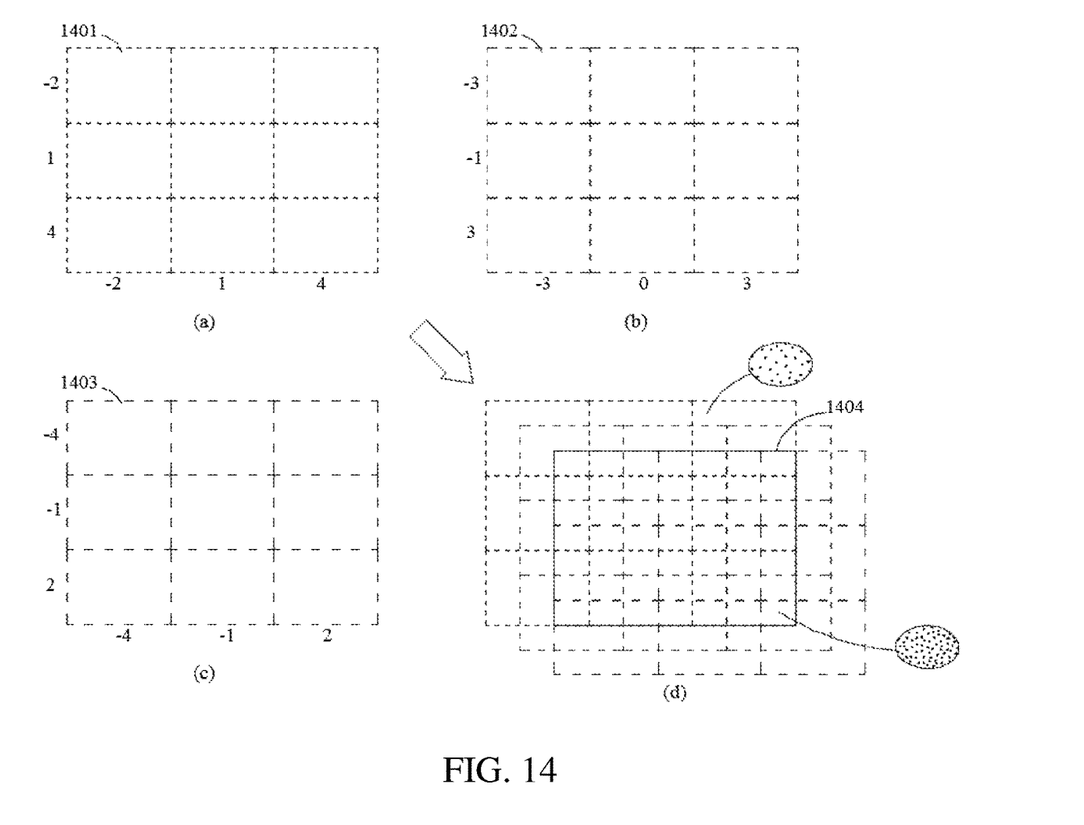
FIG. 14 is a schematic diagram of generating a structured light speckle pattern by overlapping three secondary structured light speckle patterns, according to an embodiment of the present specification.

The embodiments shown in FIG. 12 and FIG. 13 exemplarily show a structured light speckle pattern having high density and uniform distribution generated by overlapping two secondary structured light speckle patterns. According to the inventive idea, it can be conceived that it is also feasible to generate a structured light speckle pattern of higher density by overlapping two or more secondary structured light speckle patterns. FIG. 14 is a schematic diagram of generating a structured light speckle pattern by overlapping three secondary structured light speckle patterns, according to an embodiment of the present specification. FIG. 14(a) shows a first secondary structured light speckle pattern 1401 formed by speckle blocks in nine different diffraction orders (corresponding to a horizontal coordinate and a vertical coordinate in the figure). FIG. 14(b) shows a second secondary structured light speckle pattern 1402 formed by nine speckle blocks. FIG. 14(c) shows a third secondary structured light speckle pattern 1403 formed by nine speckle blocks. FIG. 14(d) shows a structured light speckle pattern formed by the first secondary structured light speckle pattern, the second secondary structured light speckle pattern, and the third secondary structured light speckle pattern that are in a staggered arrangement. A common area 1404 in which three secondary structured light speckle patterns overlap has the highest density.

FIG. 12 to FIG. 14 are only exemplary descriptions. A staggered distance is actually very small relative to the whole field-of-view angle. That is, the non-overlapping area at edges having smaller density or an area with a smaller overlapping degree (the overlapping area of the two secondary structured light speckle patterns as shown in FIG. 14) is far smaller than the effective projection areas 1203, 1303 and 1404.

FIG. 11 is a schematic diagram of a structured light projection module projecting a high density pattern, according to another embodiment of the present specification. This embodiment is described with respect to the embodiment shown in FIG. 3, a plurality of sub-structured light speckle patterns 1106 forming a structured light speckle pattern are overlapped in an overlapping manner to form a high-density structured light speckle pattern. In this embodiment, description is made by using five sub-light sources 1102 sequentially arranged in an x direction as an example. The five sub-light sources 1102 generate sub-structured light speckle patterns a, b, c, d, and e respectively through a lens 1103 and a DOE 1104. The sub-speckle patterns a, c, and e constitute a first secondary structured light speckle pattern in a tiling arrangement (that is, an immediately adjacent arrangement or an arrangement with a gap) manner. The sub-speckle patterns b and d constitute a second secondary structured light speckle pattern in a tiling arrangement manner. The first secondary structured light speckle pattern and the second secondary structured light speckle pattern overlap with a certain staggered distance to form a final structured light speckle pattern. The density of an overlapping area 1107 is increased compared to any secondary structured light speckle pattern, and the overlapping area 1107 is an effective projection area of the projection module 10. The high-density structured light speckle pattern generated by overlapping a plurality of secondary structured light speckle patterns may be in the overlapping forms shown in FIG. 12 to FIG. 14, but the speckle blocks in FIG. 12 to FIG. 14 are the sub-speckle patterns in this embodiment.

The sizes of the plurality of secondary structured light speckle patterns may be the same (as shown in the embodiment shown in FIG. 10) or different (as shown in the embodiment shown in FIG. 11), and may be configured according to requirements in practical applications. For example, in the embodiment shown in FIG. 11, a first secondary structured light speckle pattern may first be configured, which is designed to correspond to the effective projection area (for example, the effective projection area 1107 including the sub-speckle patterns b and d in FIG. 11). In addition, a second secondary structured light speckle pattern (for example, an area composed of sub-speckle patterns a, c, and e in FIG. 11) with a larger area can cover the first secondary structured light speckle patterns. Because the sub-speckle pattern forming each secondary structured light speckle pattern is formed by diffracting an individual light source via the DOE, a quantity of light sources required by the first secondary structured light speckle pattern having a smaller area should be configured to be less than a quantity of light sources corresponding to the second secondary structured light speckle pattern. Compared with the case in which the area sizes of the plurality of secondary structured light speckle patterns are the same, the embodiment can reduce the quantity of light sources, thereby reducing power consumption.

It can be understood that, in the embodiments shown in FIG. 10 to FIG. 14, the contour shapes of the light source arrangement pattern (speckle blocks) and the sub-speckle pattern of may be set to non-linear forms shown in the embodiments in FIG. 4 to FIG. 8.

In the embodiments shown in FIG. 2 and FIG. 10, the structured light speckle pattern is formed by speckle blocks, and each speckle block is composed of the plurality of sub-light sources in a same diffraction order. Therefore, it can be understood that, when the plurality of sub-light sources is configured to be controlled independently or in groups, the size of the projection area of the structured light speckle pattern does not change, but the density of the pattern changes. A larger quantity of sub-light sources turns out to be higher density. Therefore, in some embodiments, the plurality of light sources in the light source array can be divided into a plurality of sub-arrays. The sub-arrays may be in an intersecting arrangement, or in a tiling arrangement on a spatial layout. The structured light speckle pattern projections of different densities may be generated by controlling switches of the sub-arrays, which can be adapted to applications with different requirements.

In the embodiments shown in FIG. 3 and FIG. 11, the structured light speckle pattern is composed of sub-speckle patterns. The sub-speckle patterns are formed by individual sub-light sources in the light source array. Therefore, controlling the sub-light sources in the light source array independently or in groups may directly affect the size or density of the projection area. The following is described with reference to a specific embodiment.

For example, based on the principle shown in FIG. 3 and in the embodiment shown in FIG. 5 in which the structured light speckle pattern is formed, if a plurality of sub-light sources 502 in the light source array is controlled in groups, for example, the sub-light sources in an intermediate area 507 are grouped to form a first sub-light source array, and peripheral sub-light sources are grouped to form a second sub-light source array, so that two projection effects having different projection pattern area sizes can be generated. When only the first sub-light source array is turned on, the first structured light speckle pattern corresponding to an area 508 in FIG. 5(c) is formed. When the first sub-light source array and the second sub-light source array are simultaneously turned on, the structured light speckle pattern 504 in FIG. 5(c) is formed. Such a setting can better save power consumption. For example, for some applications in which the field of view is small, only a few sub-light sources are required to be turned on to satisfy requirements. In some embodiments, more sub-light source arrays may be disposed, and each sub-light source may be independently controlled.

For another example, in the embodiment shown in FIG. 11, controlling of the sub-light sources in the light source array independently or in groups may change the size of the projection pattern area, and may even change the pattern density. It is assumed that sub-light sources 1102 in the figure are marked as A, B, C, D, and E (not shown in the figure) from bottom to top, and sub-structured light speckle patterns generated by the sub-light sources are a, b, c, d, and e respectively. If the sub-light sources A, C and E are grouped to form a first sub-light source array, and sub-light sources B and D are grouped to form a second sub-light source array, when only the first sub-light source array is turned on, a first structured light speckle pattern having an area S1 and a distribution density D1 and including the sub-structured light speckle patterns a, c, and e is generated. When only the second sub-light source array is turned on, a second structured light speckle pattern having an area S2 and a distribution density D2 and including the sub-structured light speckle patterns b and d is generated. When the first sub-light source array and the second sub-light source array are simultaneously turned on, a third structured light speckle pattern having an area S3 (the effective projection area) and a distribution density D3 and including the sub-structured light speckle patterns a, b, c, d, and e is generated. It can be learned from the figure that $$S1>S2=S3, \text{ and}$$

$$D1=D2<D3.$$

Based on this idea, in some embodiments, the light source array may have other forms of group control or independent control manner. Examples are not described herein. Therefore, in this embodiment, structured light speckle patterns of various areas and various densities may be projected by using the independent control or group control of the sub-light sources in the light source array.

The foregoing content further describes the present specification in detail with reference to specific/preferred embodiments, and the description does not construe a limitation on the specific embodiments of the present specification. A person of ordinary skill in the art, to which the present specification belongs, may further make some replacements or variations to these described embodiments without departing from the idea of the present specification, and modes of the replacements or variations should all fall within the protection scope of the present specification.

What is claimed is:

1. A structured light projection module, comprising:
    a light source array, comprising a plurality of sub-light sources arranged in a two-dimensional pattern and configured to transmit array beams corresponding to the two-dimensional pattern;
    a lens configured to receive and converge the array beams; and
    a diffractive optical element (DOE) configured to receive the array beams that are emitted after being converged by the lens, and project beams in a structured light speckle pattern, wherein
    the structured light speckle pattern is formed through staggered superposition of at least two secondary structured light speckle patterns, each of the at least two secondary structured light speckle pattern is formed through a tiling arrangement of multiple sub-speckle patterns generated by a portion of the plurality of sub-light sources, and the multiple sub-speckle patterns comprise speckles in different diffraction orders formed by diffracting an individual sub-light source via the diffractive optical element; and a contour of each of the multiple sub-speckle patterns is irregular, at least one edge of each of the multiple sub-speckle patterns is non-linear in an x direction and/or in a y direction, and adjacent edges of two adjacent sub-speckle patterns are coupled to each other.

2. The structured light projection module according to claim 1, wherein the tiling arrangement comprises arranging the multiple sub-speckle patterns in a plane such that the multiple sub-speckle patterns are immediately adjacent to each other, and the adjacent edges of the two adjacent sub-speckle patterns are immediately adjacent to each other.

3. The structured light projection module according to claim 1, wherein the tiling arrangement comprises arranging the multiple sub-speckle patterns in a plane such that a gap is left between another pair of two adjacent sub-speckle patterns.

4. The structured light projection module according to claim 1, wherein the two-dimensional pattern is a regular arrangement pattern.

5. The structured light projection module according to claim 1, wherein an arrangement of the speckles in each of the multiple sub-speckle patterns is an irregular arrangement.

6. The structured light projection module according to claim 1, wherein the staggered superposition is staggered in a first direction and/or a second direction perpendicular to the first direction.

7. The structured light projection module according to claim 1, wherein the light source array further comprises a substrate, and the plurality of sub-light sources is disposed on the substrate.

8. The structured light projection module according to claim 1, wherein each of the plurality of sub-light sources comprises a vertical-cavity surface-emitting laser.

9. A structured light projection module, comprising:
a light source array, comprising a plurality of sub-light sources arranged in a two-dimensional pattern and configured to transmit array beams corresponding to the two-dimensional pattern;
a lens configured to receive and converge the array beams; and
a diffractive optical element (DOE) configured to receive the array beams that are emitted after being converged by the lens and project beams in a structured light speckle pattern, wherein
the structured light speckle pattern is formed through staggered superposition of at least two secondary structured light speckle patterns, each of the at least two secondary structured light speckle pattern is formed through a tiling arrangement of multiple sub-speckle patterns that comprises speckles in a same diffraction order, and the speckles in the same diffraction order are formed by diffracting at least a portion of the plurality of sub-light sources via the diffractive optical element; and
a contour of each of the multiple sub-speckle patterns is irregular, at least one edge of each of the multiple sub-speckle patterns is non-linear in an x direction and/or in a y direction, and adjacent edges of two adjacent sub-speckle patterns are coupled to each other.

10. The structured light projection module according to claim 9, wherein the tiling arrangement comprises arranging the multiple sub-speckle patterns in a plane such that the multiple sub-speckle patterns are immediately adjacent to each other, and the adjacent edges of the two adjacent sub-speckle patterns are immediately adjacent to each other.

11. The structured light projection module according to claim 9, wherein the tiling arrangement comprises arranging the multiple sub-speckle patterns in a plane such that a gap is left between another pair of two adjacent sub-speckle patterns.

12. The structured light projection module according to claim 9, wherein the two-dimensional pattern is a regular arrangement pattern.

13. The structured light projection module according to claim 9, wherein an arrangement of the speckles in each of the multiple sub-speckle patterns is an irregular arrangement.

14. The structured light projection module according to claim 9, wherein the staggered superposition is staggered in a first direction and/or a second direction perpendicular to the first direction.

15. The structured light projection module according to claim 9, wherein the light source array further comprises a substrate, and the plurality of sub-light sources is disposed on the substrate.

16. The structured light projection module according to claim 9, wherein each of the plurality of sub-light sources comprises a vertical-cavity surface-emitting laser.

17. A depth camera, comprising:
a structured light projection module configured to project a structured light pattern into a space, the structured light projection module comprising:
a light source array, comprising a plurality of sub-light sources arranged in a two-dimensional pattern and configured to transmit array beams corresponding to the two-dimensional pattern;
a lens configured to receive and converge the array beams; and
a diffractive optical element (DOE) configured to receive the array beams that are emitted after being converged by the lens and project beams in a structured light speckle pattern, wherein
the structured light speckle pattern is formed through staggered superposition of at least two secondary structured light speckle patterns, each of the at least two secondary structured light speckle pattern is formed through a tiling arrangement of multiple sub-speckle patterns generated by a portion of the plurality of sub-light sources, and the multiple sub-speckle patterns comprise speckles formed by diffracting an individual sub-light source via the diffractive optical element; and
a contour of each of the multiple sub-speckle patterns is irregular, at least one edge of each of the multiple sub-speckle patterns is non-linear in an x direction and/or in a y direction, and adjacent edges of two adjacent sub-speckle patterns are coupled to each other;
a collecting module configured to obtain the structured light pattern; and
a processor configured to receive the structured light pattern and calculate a depth image.

* * * * *